(12) United States Patent
Weiner (10) Patent No.: US 11,225,740 B1
(45) Date of Patent: Jan. 18, 2022

(54) ELEMENT BETWEEN BACKSHIFT AND PRIMARY BACKING METHOD

(71) Applicant: Robert S. Weiner, Atlanta, GA (US)

(72) Inventor: Robert S. Weiner, Atlanta, GA (US)

( * ) Notice: Subject to any disclaimer, the term of this patent is extended or adjusted under 35 U.S.C. 154(b) by 788 days.

(21) Appl. No.: 16/016,838

(22) Filed: Jun. 25, 2018

Related U.S. Application Data (60) Provisional application No. 62/553,430, filed on Sep. 1, 2017.

(51) Int. Cl.
| | | |
|---|---|---|
| *D05C 17/02* | (2006.01) | |
| *D06N 7/00* | (2006.01) | |
| *B32B 5/06* | (2006.01) | |
| *B32B 5/02* | (2006.01) | |
| *D06N 3/00* | (2006.01) | |

(52) U.S. Cl.
CPC ............. *D05C 17/02* (2013.01); *B32B 5/024* (2013.01); *B32B 5/06* (2013.01); *D06N 7/0068* (2013.01); *D06N 7/0071* (2013.01); *B32B 2262/101* (2013.01); *B32B 2471/02* (2013.01); *D06N 3/0036* (2013.01); *D06N 2201/082* (2013.01); *D06N 2201/12* (2013.01); *D06N 2211/263* (2013.01)

(58) Field of Classification Search
CPC .... D05C 17/023; D05C 17/026; D05C 15/30; D05C 15/10; D05C 15/20; D05C 15/26; D05C 17/02; D06N 7/0065; D06N 7/0068; D06N 7/0071; D06N 7/0073; D06N 7/0081
See application file for complete search history.

(56) References Cited

U.S. PATENT DOCUMENTS

| | | | | | |
|---|---|---|---|---|---|
| 3,605,666 | A | * | 9/1971 | Kimmel | D05C 17/02 112/410 |
| 4,053,668 | A | * | 10/1977 | Kimmel | D05C 17/02 428/95 |
| 4,069,361 | A | * | 1/1978 | Kumar | D05C 17/02 428/95 |
| 4,181,762 | A | * | 1/1980 | Benedyk | D01F 6/02 28/159 |
| 4,294,876 | A | * | 10/1981 | Camden | B32B 5/06 428/95 |
| 4,563,378 | A | * | 1/1986 | Roth | B60N 3/048 156/72 |
| 4,705,706 | A | * | 11/1987 | Avery | D05C 17/02 428/17 |
| 6,475,592 | B1 | * | 11/2002 | Irwin | B32B 5/022 428/95 |
| 6,740,386 | B2 | * | 5/2004 | Hutchison | B32B 5/06 428/88 |
| 8,359,989 | B2 | * | 1/2013 | Hall | D05C 15/34 112/80.23 |
| 2003/0143907 | A1 | * | 7/2003 | Funasako | B32B 27/12 442/43 |

(Continued)

*Primary Examiner* — Nathan E Durham
(74) *Attorney, Agent, or Firm* — Miller & Martin PLLC; Stephen J. Stark (57) ABSTRACT

Inverted carpet designs can be provided having new features. Specifically, instead of providing loop side up (like almost all carpet), the reverse side is used as the wear side (with back stitches showing). New features, like providing design elements intermediate or on the primary backing and the back stitches can be provided with various embodiments.

14 Claims, 7 Drawing Sheets

(56) References Cited

U.S. PATENT DOCUMENTS

2004/0253409 A1* 12/2004 Whitten ............... D05C 17/026
                                                                                  428/89
2007/0275207 A1* 11/2007 Higgins ............... D05C 17/023
                                                                                  428/95

* cited by examiner

ELEMENT BETWEEN BACKSHIFT AND PRIMARY BACKING METHOD

CLAIM OF PRIORITY

This application claims the benefit of U.S. Provisional Application No. 62/553,430 filed Sep. 1, 2017, which is incorporated herein by reference in its entirety.

FIELD OF THE INVENTION

Flooring goods can be made which provide a wear surface which is traditionally opposite the traditional wear surface when being tufted (i.e., the spaced apart stitching on the reverse side forms the wear surface instead of the loops or cut loops which are normally provided on the exposed side), and improvements over the prior art can be provided, or alternatively extremely short loops can be provided to provide unique constructions.

BACKGROUND OF THE INVENTION

A number of efforts have been made over the years to provide inverted carpet type constructions. Specifically, U.S. Pat. No. 4,563,378 shows a flooring configuration for automotive uses wherein cut loops are bonded in a secure manner thereby leaving the reverse side to be exposed as a wear face. Improvements to this basic idea include WO99/55954 and U.S. Pat. No. 6,740,386 as well as U.S. Pat. No. 5,560,307.

While much effort has been devoted to designing carpet from what is traditionally the front or loop face of tufted goods, relatively little effort is believed to have been expended into creating creative patterns off of the backstitch face to be used as a wear face. Little effort appears to have been directed into how short or low the pile height can be with finished goods.

Improvements to backstitch or inverted carpet constructions are believed to be desirable in the marketplace.

SUMMARY OF THE INVENTION

It is an object of many embodiments of the present invention to provide an improved carpet construction and method of manufacture utilizing the backstitch face as a wear surface.

It is another object of many embodiments of the present invention to provide an improved carpet and method of manufacture utilizing the backstitch face as a wear surface of the carpet.

It is another object of many embodiments to provide short stitches on carpet (loop or cut loop), such as less than about 1/16 inch if not about 1/32 inch.

Significant effort has been devoted to different carpet styles utilizing the traditional loop face (or cut loop face) as a wear surface. There are believed to be many, many styles directed thereto. However, a much smaller body of art exists as it relates to utilizing the backstitch face as a wear surface for the marketplace in providing extremely short loops.

No party is known to have directed multi-yarns through a single needle and then exposed the backing stitches as wear layer having multiple yarns passing through a common penetration. Additionally, no party is known to laterally shift possibly continuously across the width of the carpet so as to provide repeating patterns with such pattern appears to continuously laterally shift across its length. Furthermore, no one is known to utilizing laterally shifting or cross tufting with backstitches so as to create the impression of a lateral feature relative to a direction of tufted goods.

Furthermore, while companies have backed inverted carpet constructions with latex or pre-coats possibly over vinyl and/or fiberglass stabilizers still further improvement such as providing square tile squares, planks and/or other shapes as well as sheet goods such as broadloom or other styles are believed to be desirable. Furthermore, up to 100% nylon yarns can be utilized the exposed surface, if not up to at least 95% of the exposed surface possibly allowing some of the backing to show through for at least some embodiments.

Weights of the product can vary to be as high as one desires to as low as possibly 6 to 8 ounces and certainly less than 10 ounces while still providing greater than 95% coverage. Commercial carpets typically have a density of 5000 oz/cubic yard. The density of some preferred embodiments of the product can exceed 10,000 oz/cubic yard.

Using a very narrow hook such as a wire, face stitches can be extremely short for some embodiments.

Additional design elements may be provided on the primary backing (below the back stitches) in ways never before provided to the marketplace. While one could certainly print designs on the primary backing which might be useful to backlight to identify to add other effects, or even possibly show through, at least partially at certain locations, other embodiments could have design elements such as ribbons, yarn(s), cloth strips, or other materials extending along portions of the primary backing during the tufting process. Accordingly, as the tufting machine tufts yarn through the primary backing with needles, the needles would also puncture, pass beside and/or at least retain the design elements between the backstitch and the primary backing as the carpet is tufted, and before providing a carpet product with the back stitch visible from above when installed. The inserted material could be at least partially visible beside backstitches and/or provide elevational differences to lift at least some of the backstitches relative to others.

While certainly overtufting can be performed over a previously tufted carpet for many embodiments, tufting through a design element, such as laterally extending yarn(s) extending across the primary backing (possibly held in place with connectors, penetrations, such as could be performed with a mending gun or other instrumentality, even in an automated manner such as with a controller controlling the placement of the design element(s).

The tuft bond can be greatly increased up to the point to where the ability to attempt to pull out a tuft cannot be performed potentially without breaking the fibers. Furthermore, various cushioning effect can be provided over and above the technology provided by prior art.

BRIEF DESCRIPTION OF THE DRAWINGS

The accompanying drawings illustrate preferred embodiments of the invention and, together with the description, serve to explain the invention. These drawings are offered by way of illustration and not by way of limitation.

DETAILED DESCRIPTION OF THE PREFERRED EMBODIMENT

FIGS. 1-5 show prior art techniques that have been performed in the past. Very few such products are believed to be available in the marketplace today.

In an effort to have increased design opportunity, the applicant has begun focusing on the backstitch and short stitch area in an effort to provide an improved aesthetic and performance characteristics for different flooring products to be available in the marketplace.

Specifically, the applicant has begun utilizing almost 100% nylon of a solution dyed yarn for yarns 12, 14 in tufted goods 10 for some embodiments. Up to 100% polyester yarns for yarn 12, 14 have been used in various embodiments as well.

Figure 1:
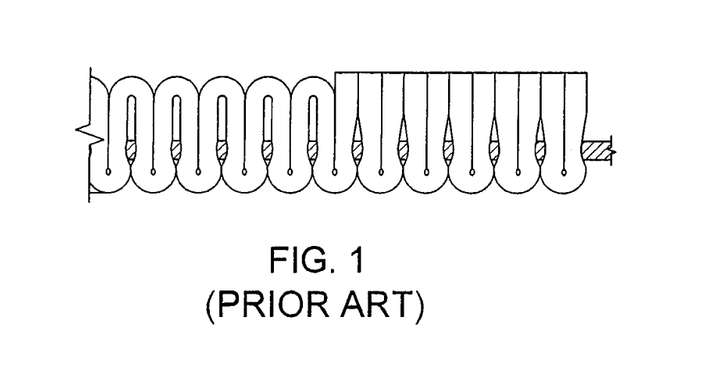
FIG. 1 is a schematized elevation view of a tufted top component of a flooring of the prior art.
Figure 2:
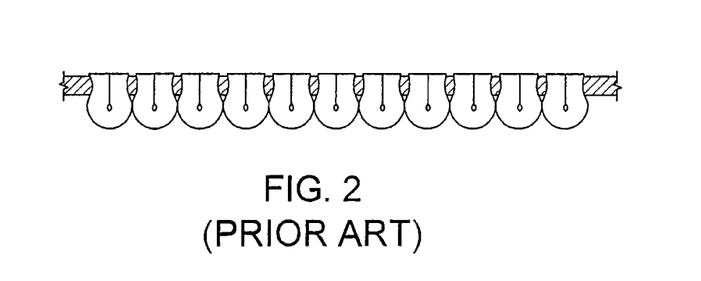
FIG. 2 is a schematized view of the top component of the prior art shown in FIG. 1.
Figure 3:
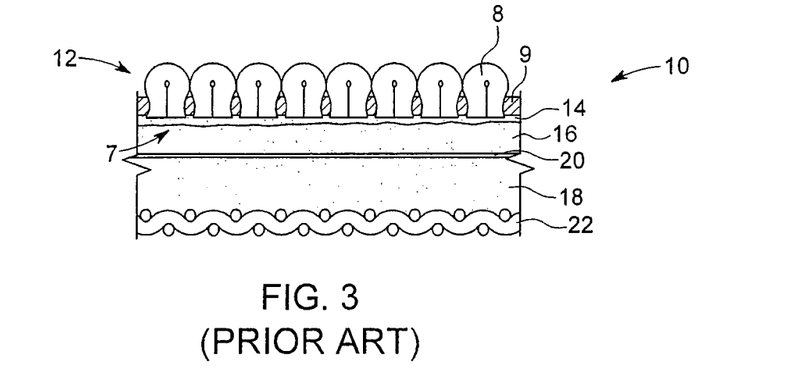
FIG. 3 is an elevation view of the flooring of the prior art shown in FIGS. 1-2.
Figure 4:
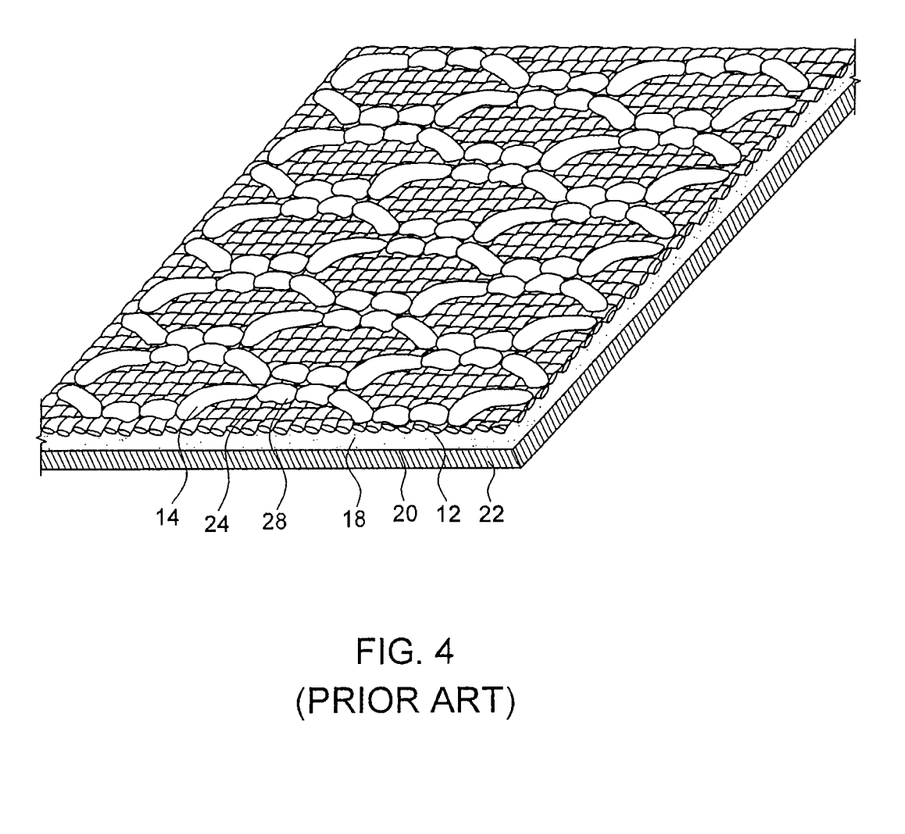
FIG. 4 is a perspective view illustrating a wear surface of a section of covering construction in accordance with a prior art technique.
Figure 5:
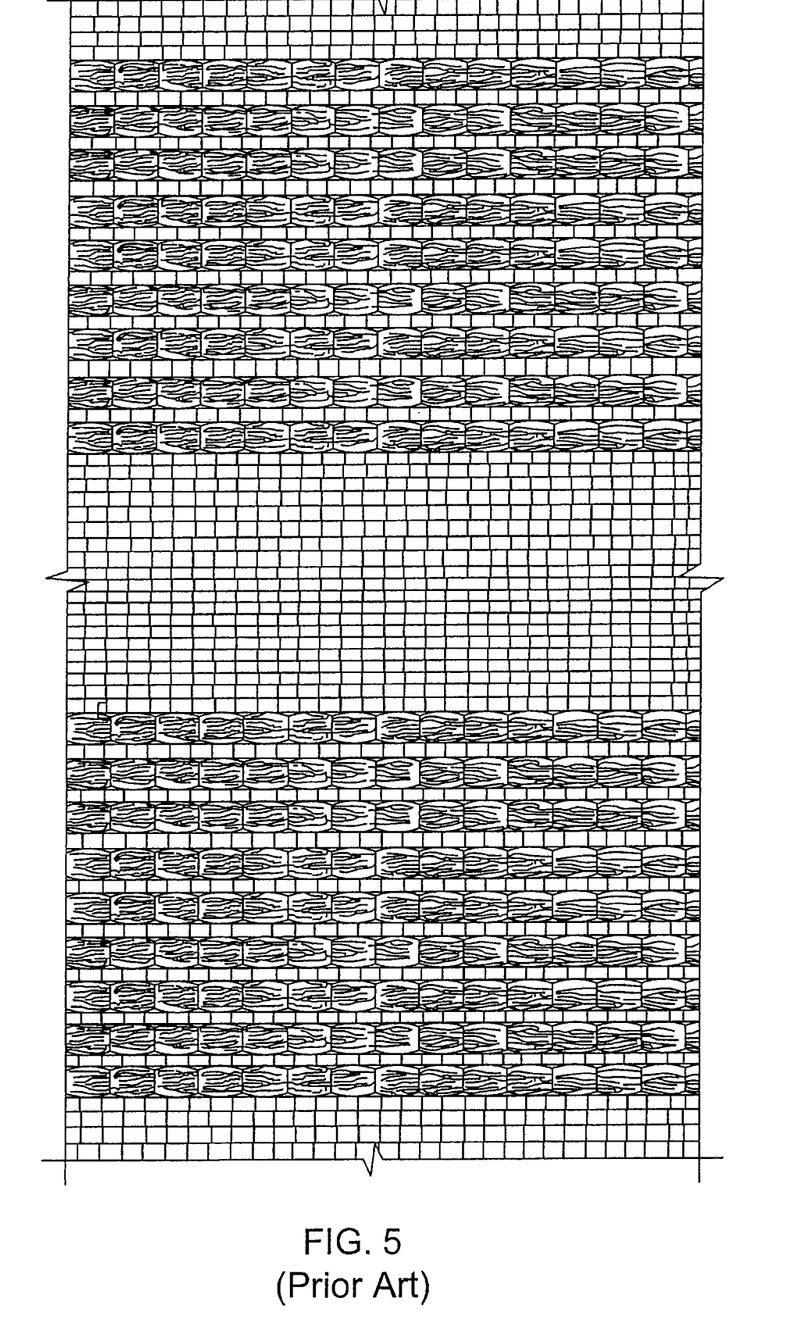
FIG. 5 is a top plan view of an alternative embodiment of a prior art construction.
Figure 6:
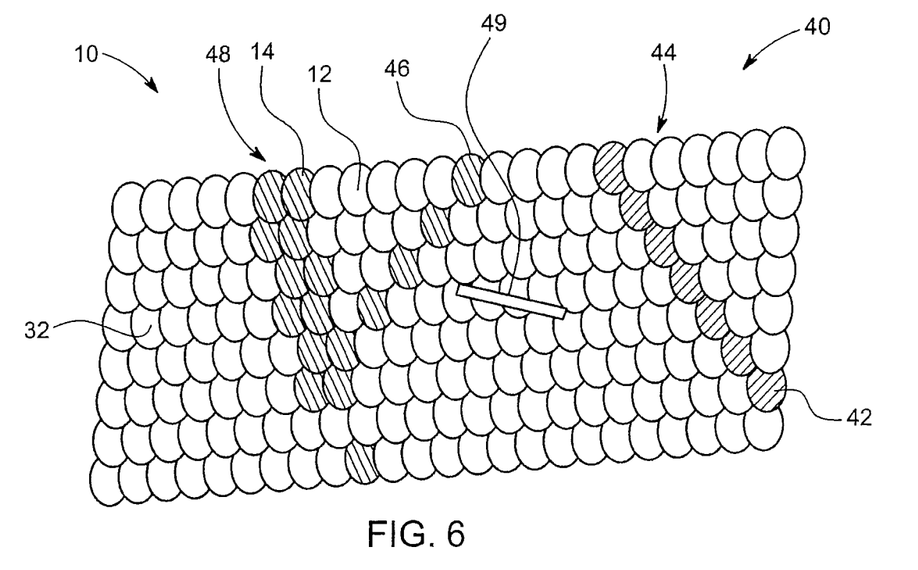
FIG. 6 is a top plan view of a presently preferred embodiment of the present invention.
Figure 7:
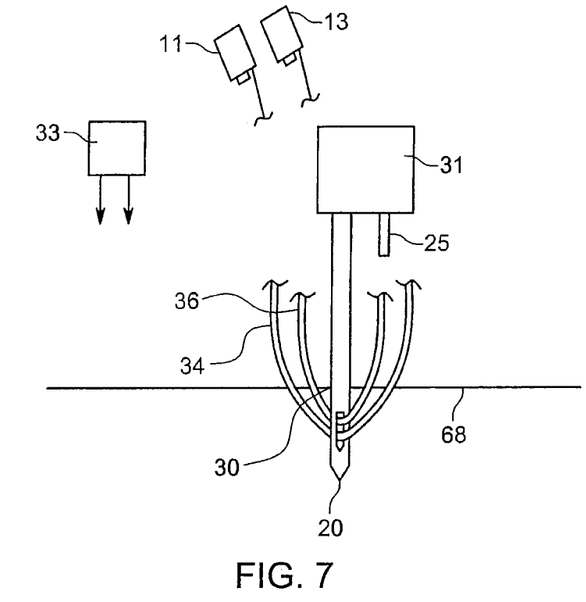
FIG. 7 is a side schematized view showing a tufting method.
Figure 8:
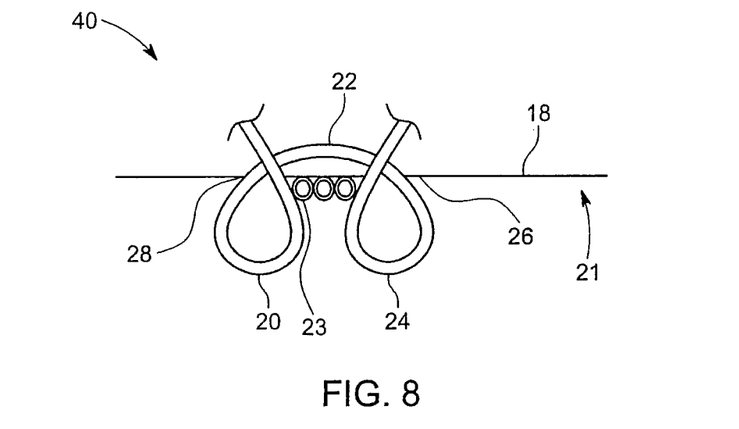
FIG. 8 is a side cross sectional view showing tufts as show in in FIG. 7 with additional backing marked.

FIGS. 6-8 show goods 10 and a side schematic view of tufting process showing both the yarns 12, 14 being directed through a single penetration 30 of a backing 18. FIG. 8 shows a side schematic view after tufting successive loops 20, 24 as can be performed on the embodiment of FIG. 6.

FIG. 6 shows the improvements over the prior art of FIGS. 1-5. Specifically carpet 10 has backstitches 12, 14 and others illustrated. Backstitches 12, 14 can be created as shown in FIGS. 7 and 8 namely the needle 16 penetrates the primary backing 18 to provide a loop 20 along with a backstitch 22 before another loop 24 is formed loop proceeding out of a penetration such as 26, 28, 30 where needle 16 penetrates the backing 18.

To the applicant's knowledge, no one has ever attempted to provide a carpet 10 utilizing backing stitches 12, 14 comprised of multiple yarns proving from penetration to penetrations 26-30. There are believed to be a number of advantages to such construction. Specifically, one can see a number of what appears to be dots 32 which are actually the backing showing through the pattern of backstitches 12, 14. This is certainly not the same idea as shown in U.S. Pat. No. 6,740,386 which intentionally provides sections of backing as decorative elements but instead applies intermittent spots of backing which may provide not only an aesthetic appeal but also potentially contribute to a lower weight product being provided in a commercially acceptable form.

Commercial embodiments such as shown in FIG. 6-8 can have an experience a tighter tuft bond that prior art carpets possibly by an order of magnitude thereof. Additionally, unlike patents such as U.S. Pat. No. 4,563,378 PCTUS9909011, there is not necessarily a need to cut the loops before providing the various liquid backing whether it be a pre-coat and a vinyl and followed by a fiberglass mat such as for stabilization, a poly back, a latex back or other back. The carpet 10 can be providing as sheet goods, as broadloom, as tiles whether they be square or plank form, or any of the other formats. Depending on the carpeting techniques utilized, multiple yarns can be directed through a single needle such as yarn 34, 36 through needle 16 as single penetration 30 in the carpet 10 to provide rather unique features particularly as compared to the prior art constructions.

With small hooks or even wire thickness or "wire" hooks, the height of tufts can be minimized on the front side to less than 1/16 inch, if not at or about 1/32 inch on the front, if not as well as backstitches.

Additionally, there is normally a direction of tuft such as direction 40 illustrated when forming the backstitches 12, 14. Possibly combining a shifting needlebar, or even cross tufting as is discussed in U.S. Pat. No. 9,512,548 incorporated herein by reference, diagonal or lateral stitches such as stitches 42 can be provided to provide somewhat of a unique affect particularly when done with multiple yarns and the spacing between stitches. Additionally, a repeating sliding affect such as sliding stripe 44, 46, 48 can continue to effectively provide a slide continuously across a pattern. This is not believed to be possible with the prior art techniques and certainly as described in any prior art.

Additionally, the effect of a sliding needlebar as providing stripe 42 is rather profound as it provides the appearance that strip 42 is overtufted over tighter backing stitches such as stitches 12, 14. Of course overtufting can occur either in one or two ways either with the same orientation of tuft as was originally provided when the tufting machine provided tufts 12, 14 and/or oppositely whereby both back stitches and front stitches are imparted onto carpet 10. This can give rather unique effects also not previously provided in the prior art, possibly when combined with cross tufting over tufting portions could still extend no more than 1/16 inch for over tufted portions (or 1/32 per layer). As with the traditional stitches, the loops could have a predetermined height based on the looping characteristics of those tufting machines such as a high or low loop. The backstitch could normally be a relatively flat pull possibly elevated to at least some degree with lateral shifting which could still then be combined with low and/or high loops whether cut or not, with the carpet reversed and tufted and/or with additional overtufting to then overlay backstitches on top of backstitches whether run in the same direction of feed 40 or in another direction. Shifting needlebars, cross tufting or other techniques could provide stripes 42 of various lengths and/or directions or other effects.

The applicant has been able to provide samples meeting exceptional quality standards in the order of 10 ounces (per square yard) and below and has even found quality products may be possible as low as 6-ounce product. Certainly, some embodiment will be in the range of 8-10 ounces per square yard. Carpet density can exceed 10,000 oz/cubic yards (36× face weight/carpet pile height) where commercial carpet is typically around 5,000 oz/square yard and for a single layer of carpet. Even high density can be obtained with overtufting techniques, such as around 11,520, or even higher.

Some embodiments could provide a method of producing carpet 10 comprising the steps of (a) directing a backing through a first tufting machine whereby a selected needle 16 directs at least two adjacent yarn strands 12, 14 originating from different supply locations 11, 13 through an opening or penetration 30 in the backing 18 led by the needle 16 thereby providing a first selected loop 20 on a back side 21 of the backing 18 opposite the direction from which the needles 16 contact the backing 18, (b) tufting with other needles 25 into the backing 18 adjacent to the first loop 20 to provide adjacent loops 23, and skipping at least one adjacent loops 23 and then directing the selected needles 16 through the backing 18 to provide a second selected loop 24 spaced by the at least one adjacent loops 23 from the first selected loop 20 as a back stitch 22 opposite the backing 18 from the first and second selected loops 20, 24; and then (c) exposing the back stitch 22 on an exposed wear layer of carpet 10 which downwardly orients the first and second loops 20, 24 behind the backing 18.

For some embodiments, a backing layer (similar to the one shown in FIG. 3) can be applied over the first and second loops 20, 24 opposite the back stitch 22. The back stitch 22 can be an upper portion of the wear layer such as illustrated in FIG. 6 and others. The back stitch 22 can also be tufted in a lateral direction (angled, or even perpendicular direction) relative to a direction of tuft 29 (or feed of the backing through the tufting machine). Also, portions of the backing 18 may be visible from above for at least some embodiments. Some embodiments may only direct single yarn strands 12 or 14 through each needle 16 rather than multiple adjacent strands from separate creel locations 11, 13.

Other embodiments could provide a method of producing carpet 10 comprising the steps of (a) providing a backing 18 having been tufted with loops 23 on a back side 21 of the carpet 10, (b) directing the backing 18 through a first tufting machine 31 whereby selected needles 16 direct yarn strands 12 and/or 14 through openings 26, 28, and/or 30 in the backing 18 led by the needle 16 thereby providing a first selected loop 24 on the back side 21 of the backing 18 opposite the direction from which the needles 16 contact the backing 18 which is a front side or a first side 19 of the primary backing 18, applying a design element 17, 52 selected from the group of at least one yarn (such as multiple yarns, possibly with two 21, 23 in contact in a lateral direction (as opposed to a direction of tuft to which a lateral direction would be perpendicular thereto), a ribbon, cloth, printing on the first side of the primary backing 18, or other design elements, (c) directing the selected needles 16 through the backing 18 to provide a second selected loop 20 thereby providing a back stitch 22 opposite the backing 18 from the first and second selected loops 20, 24 as an overtufted back stitch 22, and then (d) exposing the overtufted back stitch 22 as an upper portion of a wear layer of the carpet 10 which downwardly orients the first and second loops 20, 24 (if not cut at some point in the process) behind and below the backing 18.

For some embodiments, the back stitch 22 may extend through the design element 17 such as between adjacent yarns 21, 23, (possibly through fabric such as cloth 57, ribbon, etc.). Adjacent yarns 21, 23 and/or others may contact one another, or even be twisted at least somewhat along a lateral direction (relative to the direction of tuft). Penetrations 25, 27 may be used such as at or near opposing edges 29, 31 of a backing 18 (or possibly even some intermediate thereto by yarns into the backing such as by an applicator 33 (such as a mending gun type construction to apply yarns 21, 23 or other constructions, particularly if the design element 17 is something other than yarns 21 or 23). Other techniques may or may not be employed to at least temporarily hold design element 17 in at least a desired approximate position on the primary backing 18 before tufting with the tufting machine 31 and/or other tufting machine. The applicator 33 may be mounted on a track 35 which may be under the direction of a controller 37 which may direct the movement (at least linearly, such as laterally relative to the direction of tuft) of the applicator 33 to apply the design element 17 at specific locations on the primary backing 18.

Figure 9:
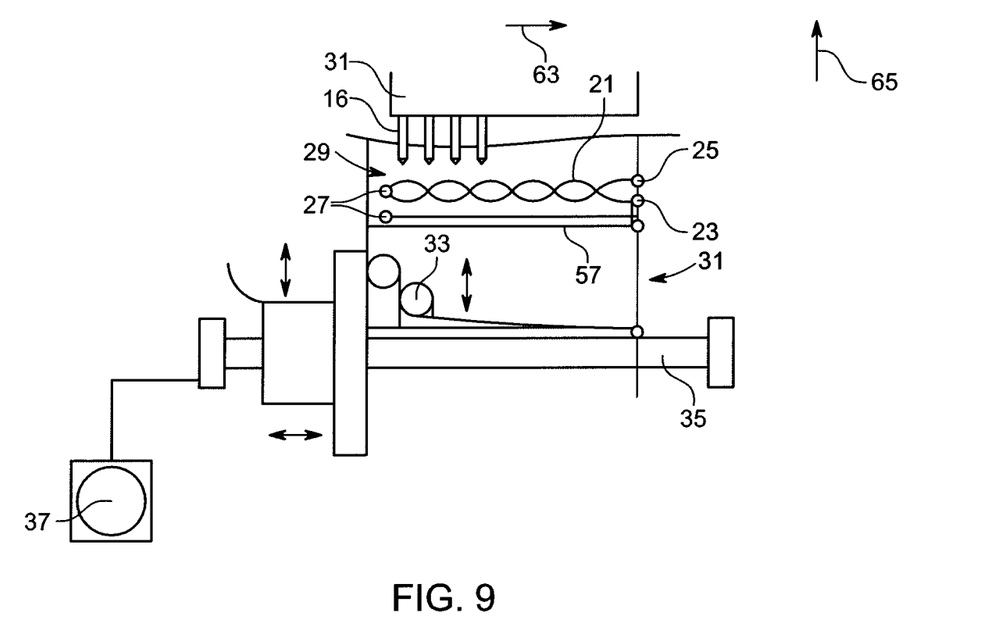
FIG. 9 is a front plan view of a portion of a tufting machine and applicator system for use in at least some embodiments of the present invention.
Figure 10:
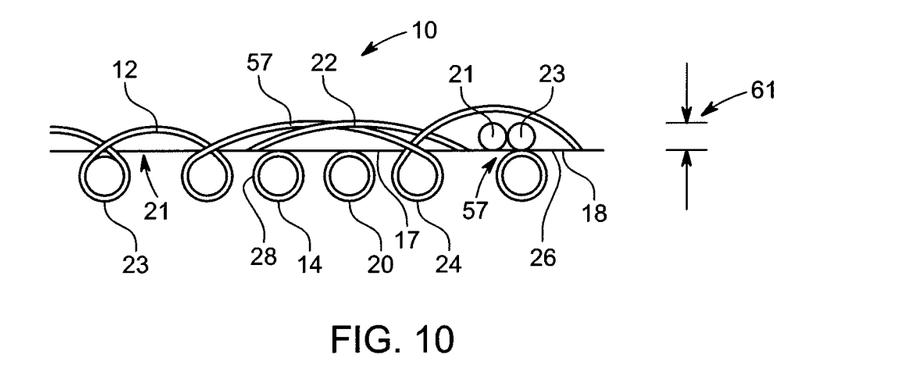
FIG. 10 is a side cross sectional view similar to FIG. 8 showing back stitches extending over and through design elements located on the primary backing.
Figure 11:
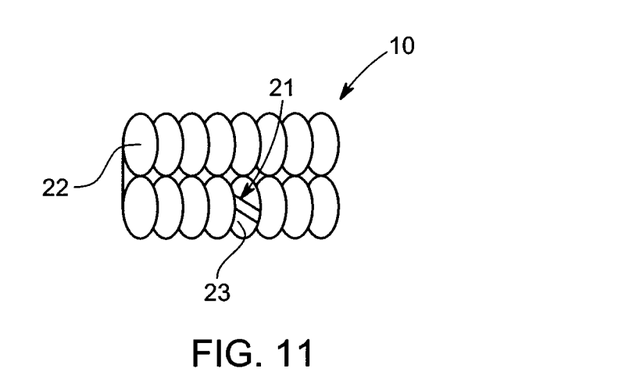
FIG. 11 is a top plan view showing design elements as they may appear in at least some embodiments relative to at least some back stitches.
Figure 12:
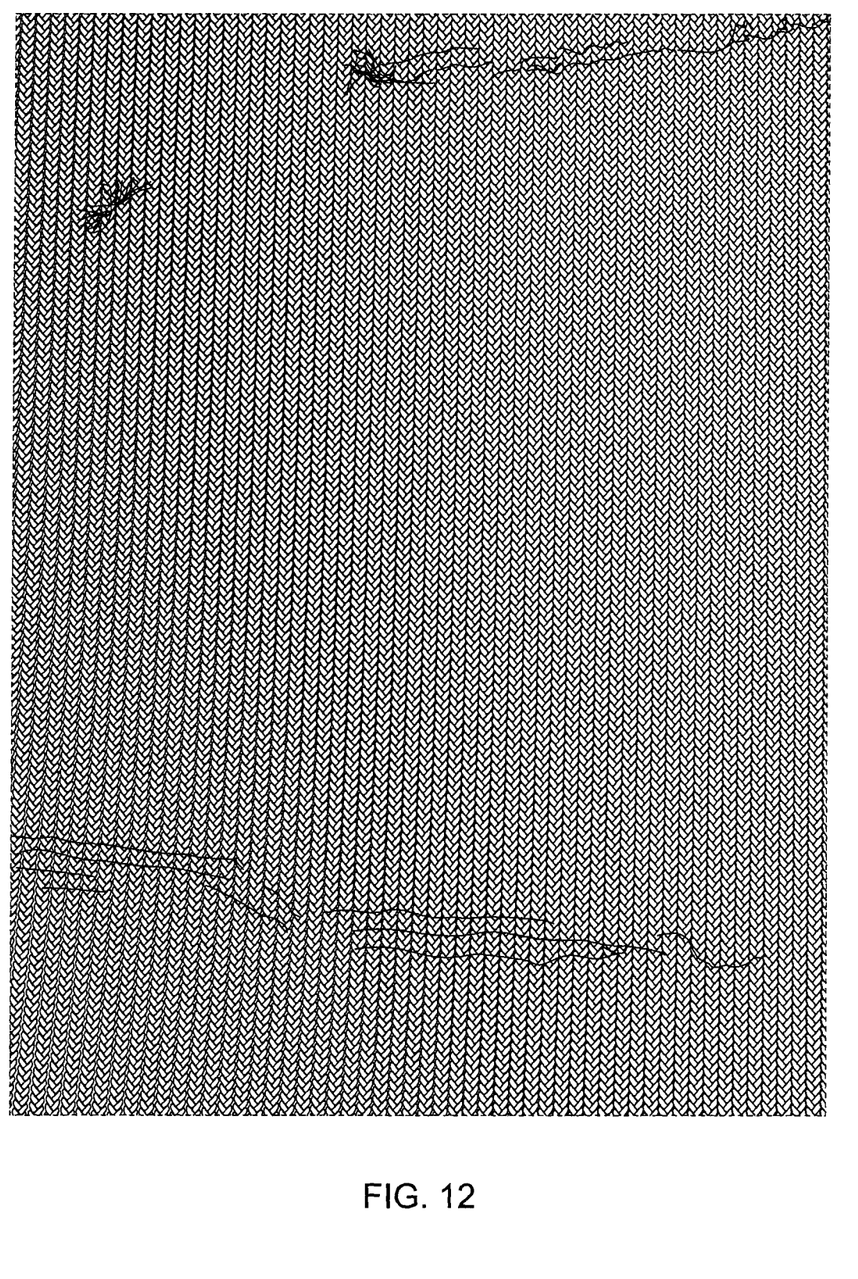
FIG. 12 is a color photograph showing an embodiment of the present invention.

The applicator 33 can also move into and out of engagement with the primary backing 18 as would be understood by those of ordinary skill in the art. Furthermore, some configurations may provide for the movement of the applicator parallel to the direction of tuft such as by connecting the applicator 33 to a trolley 37, moving the track 35, etc., preferably under the direction of the controller 37. When the design element 17 has sufficient thickness 61, it can push the back stitches 22 away from the primary backing 18 more than in locations where there is no design element 17. Portion(s) of design element 17 may be seen beside such stitches 22 or even "through" them (and/or provide texture). As can be seen with reference to FIG. 9, it may be that the applicator 33 applies a design element 17 to be principally oriented in lateral direction 63 relative to the direction of tuft 65.

Depending on the cushioning selected by the user and/or locking materials, the carpet 10 can have one or a plurality of preferred resilience and/or wear characteristics.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of producing carpet comprising the steps of:
   a) directing a primary backing through a first tufting machine whereby a selected needle directs yarn strand through an opening created in a front side of the primary backing led by the needle thereby providing a first selected loop on a back side of the backing opposite the direction from which the needles contact the backing;
   b) applying a design element against the front side of the primary backing, wherein the design element is at least one yarn wherein the at least one yarn is a plurality of yarns;
   c) tufting with other needles into the backing adjacent to the first loop to provide adjacent loops, and directing the selected needle through the backing to provide a second selected loop spaced from the first selected loop as a back stitch opposite the backing from the first and second selected loops, with the back stitch extending over at least a portion of the design element; and then
   d) exposing the back stitch on an exposed wear layer of carpet which downwardly orients the first and second loops behind the backing; and
   wherein at least two of the plurality of yarns contact one another as the yarns proceed laterally relative to a direction of tuft.

2. The method of claim 1 wherein the at least two of the plurality of yarns have at least some twist.

3. The method of claim 1 wherein the at least one yarn is secured with penetrations through the primary backing.

4. A method of producing caret comprising the steps of:
   a) directing a primary backing through a first tufting machine whereby a selected needle directs yarn strand through an opening created in a front side of the primary backing led by the needle thereby providing a first selected loop on a back side of the backing opposite the direction from which the needles contact the backing;

b) applying a design element against the front side of the primary backing, wherein the design element is at least one yarn wherein the at least one yarn is a plurality of yarns;

c) tufting with other needles into the backing adjacent to the first loop to provide adjacent loops, and directing the selected needle through the backing to provide a second selected loop spaced from the first selected loop as a back stitch opposite the backing from the first and second selected loops, with the back stitch extending over at least a portion of the design element; and then d) exposing the back stitch on an exposed wear layer of carpet which downwardly orients the first and second loops behind the backing; and wherein the at least one yarn extends laterally relative to a direction of tuft.

5. The method of claim 4 wherein the design element is applied with a controller as a portion of a continuous process including the tufting process with the tufting machine.

6. A method of producing carpet comprising the steps of:

a) directing a primary backing through a first tufting machine whereby a selected needle directs yarn strand through an opening created in a front side of the primary backing led by the needle thereby providing a first selected loop on a back side of the backing opposite the direction from which the needles contact the backing;

b) applying a design element against the front side of the primary backing, wherein the design element is selected from the group of at least one yarn, ribbon, cloth, printing on the backing, and wherein the design element is applied with a controller as a portion of a continuous process including the tufting process with the tufting machine with an applicator moving along a track before the backing moves into the tufting machine;

c) tufting with other needles into the backing adjacent to the first loop to provide adjacent loops, and directing the selected needle through the backing to provide a second selected loop spaced from the first selected lop as a back stitch opposite the backing from the first and second selected loops, with the back stitch extending over at least a portion of the design element; and then d) exposing the back stitch on an exposed wear layer of carpet which downwardly orients the first and second loops behind the backing.

7. The method of claim 6 wherein the track at least assists in providing at least linear motion of the applicator along a lateral direction of tuft.

8. The method of claim 7 wherein the applicator selectively moves into and out of engagement with the primary backing.

9. The method of claim 8 wherein the applicator moves parallel to the direction of tuft while applying the design element.

10. The method of claim 9 wherein the design element elevates an upper surface of the back stitch above surrounding back stitches not having the design element.

11. The method of claim 9 wherein the design element is oriented in the lateral direction which is perpendicular to a direction of tuft.

12. A method of producing carpet comprising the steps of:

a) directing a primary backing through a tufting machine whereby selected needles direct yarn strands through openings in the primary backing led by the needle from a first side of the primary backing thereby each respectively providing a first selected loop on a back side of the primary backing opposite the direction from which the needles contact the backing;

b) applying a design element adjacent to the first side of the primary backing; wherein design element is at least one yarn wherein the at least one yarn is a plurality of yarns, and wherein at least two of the plurality of yarns contact one another as the yarns proceed laterally relative to a direction of tuft;

c) while tufting with other needles into the backing adjacent to the loop as adjacent loops, directing the selected needles through the backing laterally to a direction of tuft to provide a second selected loop thereby providing a back stitch opposite the backing from the first and second selected loops; and then d) exposing the back stitch as an upper portion of a wear layer of the carpet which downwardly orients the first and second loops behind the backing.

13. The method of claim 12 further comprising the step of having the back stitch extend through at least a portion of the design element on the first side of the primary backing.

14. The method of claim 12 wherein the design element is applied with a controller as a portion of a continuous process including the tufting process with the tufting machine.

\* \* \* \* \*